(12) United States Patent　Chen

(10) Patent No.: US 11,946,600 B1
(45) Date of Patent: Apr. 2, 2024

(54) PIPELINE DETECTION DEVICE

(71) Applicant: Shenzhen Sanyi Technology Co., Ltd., Shenzhen (CN)

(72) Inventor: Xiaoquan Chen, Jieyang (CN)

( * ) Notice: Subject to any disclaimer, the term of this patent is extended or adjusted under 35 U.S.C. 154(b) by 0 days.

(21) Appl. No.: 18/485,122

(22) Filed: Oct. 11, 2023

(51) Int. Cl.
| | |
|---|---|
| F17D 3/01 | (2006.01) |
| H02G 11/02 | (2006.01) |
| F16L 101/30 | (2006.01) |
| F16L 101/50 | (2006.01) |
| F17D 5/06 | (2006.01) |
| H02G 11/00 | (2006.01) |
| H02G 15/00 | (2006.01) |
| H02G 15/02 | (2006.01) |
| H04N 5/253 | (2006.01) |
| H04N 7/18 | (2006.01) |
| H04N 23/50 | (2023.01) |

(52) U.S. Cl.
CPC ............. *F17D 3/01* (2013.01); *H02G 11/02* (2013.01); *F16L 2101/30* (2013.01); *F16L 2101/50* (2013.01); *F17D 5/06* (2013.01); *H02G 11/00* (2013.01); *H02G 15/00* (2013.01); *H02G 15/02* (2013.01); *H04N 5/253* (2013.01); *H04N 7/18* (2013.01); *H04N 23/50* (2023.01)

(58) Field of Classification Search
CPC .. F17D 3/01; F17D 5/06; H02G 11/02; H02G 11/00; H02G 15/00; H02G 15/02; F16L 2101/30; F16L 2101/50; F16M 2200/08; H04N 7/18; H04N 23/50; H04N 5/225; H04N 5/253

USPC .............................................. 137/551; 348/84
See application file for complete search history.

(56) References Cited

U.S. PATENT DOCUMENTS

| | | | | |
|---|---|---|---|---|
| 3,739,089 | A * | 6/1973 | Latall ...................... | G01M 3/38 348/84 |
| 4,989,582 | A * | 2/1991 | Sakiyama ............... | A61B 1/042 348/E5.025 |
| 6,313,869 | B1 * | 11/2001 | Hyp ...................... | G21C 17/017 348/82 |
| 6,374,970 | B1 | 4/2002 | Liao | |
| 6,930,721 | B2 | 8/2005 | Gelbard | |
| 7,909,281 | B2 | 3/2011 | Liao | |
| 8,908,027 | B2 * | 12/2014 | Kleyn ................... | B65H 75/364 348/84 |
| 8,970,211 | B1 * | 3/2015 | Olsson ................... | G01D 5/145 324/220 |
| 10,886,718 | B2 * | 1/2021 | Wells ..................... | H02G 11/02 |

(Continued)

*Primary Examiner* — Minh Q Le

(57) ABSTRACT

The invention discloses a pipeline detection device, which comprises: a mounting frame provided in a three-layer structure; a first wire spool mounted at a middle layer of the mounting frame and wound with a first climbing wire, wherein the first climbing wire is connected to a first detection camera, and a photographing direction of the first lens extends along an axial direction of the first climbing wire; a second wire spool mounted at a bottom layer of the mounting frame, wherein the second climbing wire is connected to a second detection camera, a photographing direction of the second lens extends along an axial direction of the second climbing wire, and a photographing direction of the third lens extends along a radial direction of the second climbing wire. The invention solves the problem that the existing pipeline detection device cannot adapt to the detection requirements of different pipeline environments.

10 Claims, 5 Drawing Sheets

(56) References Cited

U.S. PATENT DOCUMENTS

| | | | | |
|---|---|---|---|---|
| 2003/0052967 A1* | 3/2003 | Brunton | ................. | B65H 75/40 |
| | | | | 348/E7.086 |
| 2010/0208056 A1* | 8/2010 | Olsson | ................... | G01D 11/30 |
| | | | | 348/84 |
| 2011/0057067 A1* | 3/2011 | Aaland | ............. | B65H 75/4486 |
| | | | | 242/390.2 |
| 2012/0147173 A1* | 6/2012 | Lynch | .................. | G01N 21/954 |
| | | | | 348/E7.087 |
| 2014/0176696 A1* | 6/2014 | Chapman | .............. | H04N 23/50 |
| | | | | 348/84 |
| 2014/0210989 A1* | 7/2014 | Olsson | ................... | H04N 7/183 |
| | | | | 348/84 |
| 2014/0340505 A1* | 11/2014 | Olsson | ................... | H04N 23/66 |
| | | | | 348/84 |
| 2015/0055005 A1* | 2/2015 | Olsson | ................... | H04N 23/54 |
| | | | | 348/333.06 |
| 2017/0024872 A1* | 1/2017 | Olsson | .............. | G02B 23/2484 |
| 2017/0163940 A1* | 6/2017 | Olsson | ................... | H04N 23/57 |
| 2019/0346330 A1* | 11/2019 | Krohlow | ............. | G01M 3/005 |
| 2020/0166172 A1* | 5/2020 | Liu | ....................... | F16L 55/162 |
| 2020/0188624 A1* | 6/2020 | Nelson Mock | ..... | A61M 16/104 |
| 2021/0164601 A1* | 6/2021 | Warren | ............. | B65H 75/4484 |
| 2021/0260879 A1* | 8/2021 | Simpfendorfer | ...... | B08B 9/0495 |
| 2022/0085592 A1* | 3/2022 | Olsson | ................... | H02G 11/02 |
| 2022/0416528 A1* | 12/2022 | Martin | ................... | H02G 11/02 |
| 2023/0038357 A1* | 2/2023 | Olsson | ................... | H04N 23/51 |
| 2023/0126099 A1 | 4/2023 | Funakoshi | | |
| 2023/0130552 A1 | 4/2023 | Meguro et al. | | |

* cited by examiner

PIPELINE DETECTION DEVICE

TECHNICAL FIELD

The present invention relates to the technical field of detection equipment, and in particular, to a pipeline detection device.

BACKGROUND

A pipeline detection device is a novel high-tech product designed and produced based on the detection requirements of the inner surfaces of straight pipelines in petrochemical industry, industrial machinery, electronic and electrical industry, aerospace and the like, and integrates light, machinery, electricity and image processing software, so that an operating personnel uses a high-power clear color CCD to freeze, amplify, analyze, measure and print reports of suspicious points and flaw detection positions in the observed pipeline with a special professional software processing system, and the accuracy of determining the flaw detection positions on the inner wall of the pipeline is greatly improved.

The existing pipeline detection device is generally connected to a camera through a control box to perform pipeline detection, this structure can only perform detection on a single pipeline at a single time, and a mounting angle of the camera is fixed; consequently, the pipeline detection device cannot adapt to the detection requirements of different pipeline environments.

SUMMARY

A primary objective of the present invention is to provide a pipeline detection device, which aims to solve the problem that the existing pipeline detection device cannot adapt to detection requirements of different pipeline environments.

In order to achieve the above objective, the present invention provides a pipeline detection device, comprising:
  a mounting frame provided in a three-layer structure;
  a main case configured to control the pipeline detection device to detect and analyze a pipeline and mounted at a top layer of the mounting frame;
  a first wire spool mounted at a middle layer of the mounting frame, wherein a first rotating mechanism configured to drive the first wire spool to rotate is mounted at the middle layer of the mounting frame, a first climbing wire is wound on the first wire spool, one end of the first climbing wire is connected to the main case, the other end of the first climbing wire is connected to a first detection camera, the first detection camera is provided with a first lens, and a photographing direction of the first lens extends along an axial direction of the first climbing wire; and
  a second wire spool mounted at a bottom layer of the mounting frame, wherein a second rotating mechanism configured to drive the second wire spool to rotate is mounted at the bottom layer of the mounting frame, a second climbing wire is wound on the second wire spool, one end of the second climbing wire is connected to the main case, the other end of the second climbing wire is connected to a second detection camera, the second detection camera is provided with a second lens and a third lens, a photographing direction of the second lens extends along an axial direction of the second climbing wire, and a photographing direction of the third lens extends along a radial direction of the second climbing wire.

Optionally, the second detection camera comprises a second front housing and a second tail housing, and further comprises a rotary driving member configured to drive the second front housing to rotate, the rotary driving member is connected to the second tail housing through a flexible spring, the second lens is mounted at an end of the second front housing, and the third lens is mounted at a side surface of the second front housing.

Optionally, the rotary driving member comprises a middle housing, a rotary motor is mounted in the middle housing, a driving end of the rotary motor is connected to a driving gear, the driving gear is engaged with a driven gear, and the second front housing is in transmission connection with the driven gear.

Optionally, the main case comprises a case body and a case cover, a main control circuit board and a control keyboard are mounted in the case body, a display screen is mounted at an inner side of the case cover, a protection plate is further mounted at an outer side of the display screen, and the protection plate is rotatably mounted on the case cover.

Optionally, the case body is further filled with EVA foam.

Optionally, the first rotating mechanism and the second rotating mechanism each comprise a fixed front cover, an anti-abrasion rotating sleeve is arranged inside the fixed front cover, a first PCB is arranged inside the fixed front cover, the first PCB is located inside the anti-abrasion rotating sleeve, a bearing seat is arranged at one side of the first PCB, a bearing is arranged inside the bearing seat, a first slip ring and a second slip ring are arranged inside the bearing, a bottom cover is clamped at one end that is of the fixed front cover and that is located at an outer side of the second slip ring, a first tailstock is arranged at one end of the bottom cover, a first waterproof ring is arranged at a joint of the bottom cover and the first tailstock, a second PCB is arranged inside the first tailstock, and a waterproof rubber plug is arranged at one end of the first tailstock.

Optionally, the first detection camera comprises a first front housing and a first tail housing, the first front housing and the first tail housing are connected through a flexible spring, and the first lens is mounted at an end of the first front housing.

Optionally, a plurality of guide pulleys are uniformly mounted at outer sides of the first detection camera and the second detection camera.

Optionally, the mounting frame is provided in an iron frame structure, and an anti-skidding clamping block is detachably mounted at a bottom of the mounting frame.

Optionally, a first camera mounting seat configured to mount the first detection camera and a second camera mounting seat configured to mount the second detection camera are further provided on the mounting frame.

The present invention has the beneficial effects that: the structure of the existing pipeline detection device is improved; the mounting frame is provided in a three-layer structure, wherein one layer is configured to place a main case, and the remaining two layers are configured to place wire spools; climbing wires and detection cameras are wound on the wire spools, the pipeline detection device is provided with two groups of different detection cameras by the arrangement of two groups of wire spools, a photographing direction of one detection camera extends along an axial direction of the climbing wires, photographing directions of the other detection camera comprise two directions, wherein one direction also extends along the axial direction of the climbing wire, and the other direction extends along a radial direction of the climbing wire; and the pipeline detection device has the capability of photographing and detecting in different directions, so that the pipeline detection device can adapt to the detection requirements of different pipeline environments.

BRIEF DESCRIPTION OF DRAWINGS

In order to more clearly illustrate the technical solutions in the embodiments of the present invention or in the prior art, the drawings required to be used in the description of the embodiments or the prior art are briefly introduced below. It is obvious that the drawings in the description below are some embodiments of the present invention, and those of ordinary skill in the art can obtain other drawings according to the structures illustrated in these drawings without creative efforts.

Figure 1:
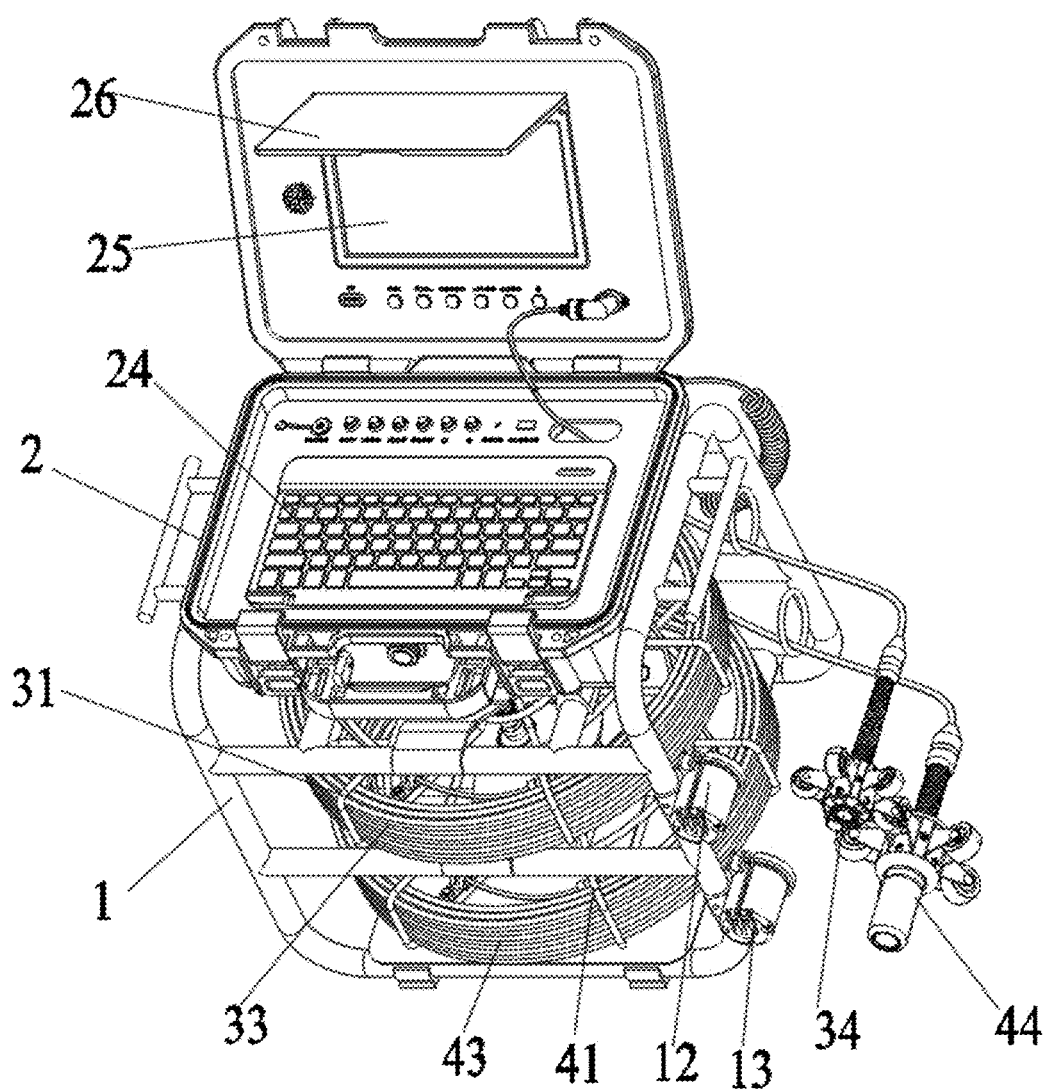
FIG. 1 is a schematic diagram of an overall structure of a pipeline detection device according to the present invention.

The realization of the objectives, the functional features, and the advantages of the present invention will be further explained in conjunction with the embodiments and with reference to the drawings.

DETAILED DESCRIPTION OF EMBODIMENTS

The following clearly and completely describes the technical solutions in the embodiments of the present invention with reference to drawings in the embodiments of the present invention. It is clear that the described embodiments are merely a part rather than all of the embodiments of the present invention. All other embodiments obtained by those of ordinary skill in the art based on embodiments of the present invention without creative efforts shall fall within the protection scope of the present invention.

It should be noted that, if directional indications (such as upper, lower, left, right, front and rear) are involved in the embodiments of the present invention, the directional indications are only used to explain the relative positional relationships, the motion situations and the like between individual components under a certain pose (as shown in the drawings), and if the certain pose is changed, the directional indications are changed accordingly.

In addition, if there are descriptions relating to "first", "second" and the like in the embodiments of the present invention, the descriptions of "first", "second" and the like are for descriptive purposes only and are not to be construed as indicating or implying relative importance thereof or implicitly indicating the quantities of the indicated technical features. Thus, a feature defined by "first" or "second" may explicitly or implicitly include at least one such feature. In addition, "and/or" appearing herein is meant to include three parallel solutions, and taking "A and/or B" as an example, it includes solution A, or solution B, or both solution A and solution B. In addition, the technical solutions among various embodiments may be combined with each other, however, this combination must be based on that it can be realized by those of ordinary skill in the art. When the combination of the technical solutions is contradictory or cannot be realized, such a combination of the technical solutions should not be considered to exist, and is not within the protection scope of the present invention.

An embodiment of the present invention provides a pipeline detection device, referring to FIG. 1, which comprises:
- a mounting frame 1, wherein the mounting frame 1 provided in a three-layer structure;
- a main case 2 configured to control the pipeline detection device to detect and analyze a pipeline and mounted at a top layer of the mounting frame 1;
- a first wire spool 31 mounted at a middle layer of the mounting frame 1, wherein a first rotating mechanism 32 configured to drive the first wire spool 31 to rotate is mounted at the middle layer of the mounting frame 1, a first climbing wire 33 is wound on the first wire spool 31, one end of the first climbing wire 33 is connected to the main case 2, the other end of the first climbing wire 33 is connected to a first detection camera 34, the first detection camera 34 is provided with a first lens 35, and a photographing direction of the first lens 35 extends along an axial direction of the first climbing wire 33; and
- a second wire spool 41 mounted at a bottom layer of the mounting frame 1, wherein a second rotating mechanism 42 configured to drive the second wire spool 41 to rotate is mounted at the bottom layer of the mounting frame 1, a second climbing wire 43 is wound on the second wire spool 41, one end of the second climbing wire 43 is connected to the main case 2, the other end of the second climbing wire 43 is connected to a second detection camera 44, the second detection camera 44 is provided with a second lens 45 and a third lens 46, a photographing direction of the second lens 45 extends along an axial direction of the second climbing wire 43, and a photographing direction of the third lens 46 extends along a radial direction of the second climbing wire 43.

It should be noted that, this embodiment has improved the structure of the existing pipeline detection device. Firstly, the mounting frame 1 is provided in a three-layer structure, wherein a top layer is configured to place a main case 2 and is provided for an operating personnel to perform relevant detection operations to the main case 2, and the main case 2 places at the highest layer with a certain mounting height, which is convenient for the operating personnel to operate.

Secondly, the remaining two layers are configured to place wire spools, the wire spools are placed in the middle layer and the bottom layer for storage, and the wire spools can be protected to a certain extent through a frame body structure of the mounting frame 1. In this embodiment, the wire spools are wound with climbing wires and detection cameras, and the pipeline detection device is provided with two groups of different detection cameras through the arrangement of the two groups of wire spools. Specifically, a photographing direction of one detection camera extends along an axial direction of the climbing wires, photographing directions of the other detection camera comprise two directions, wherein one direction also extends along the axial direction of the climbing wire, and the other direction extends along a radial direction of the climbing wire; this structure can enable pipeline detection device to have the capability of photographing and detecting in different directions, can perform the detection operation of two pipelines at one time, thus promoting detection efficiency, and can also adapt to the detection requirements of different pipeline environments. Moreover, multi-angle detection can further improve the accuracy of detection results.

Figure 3:
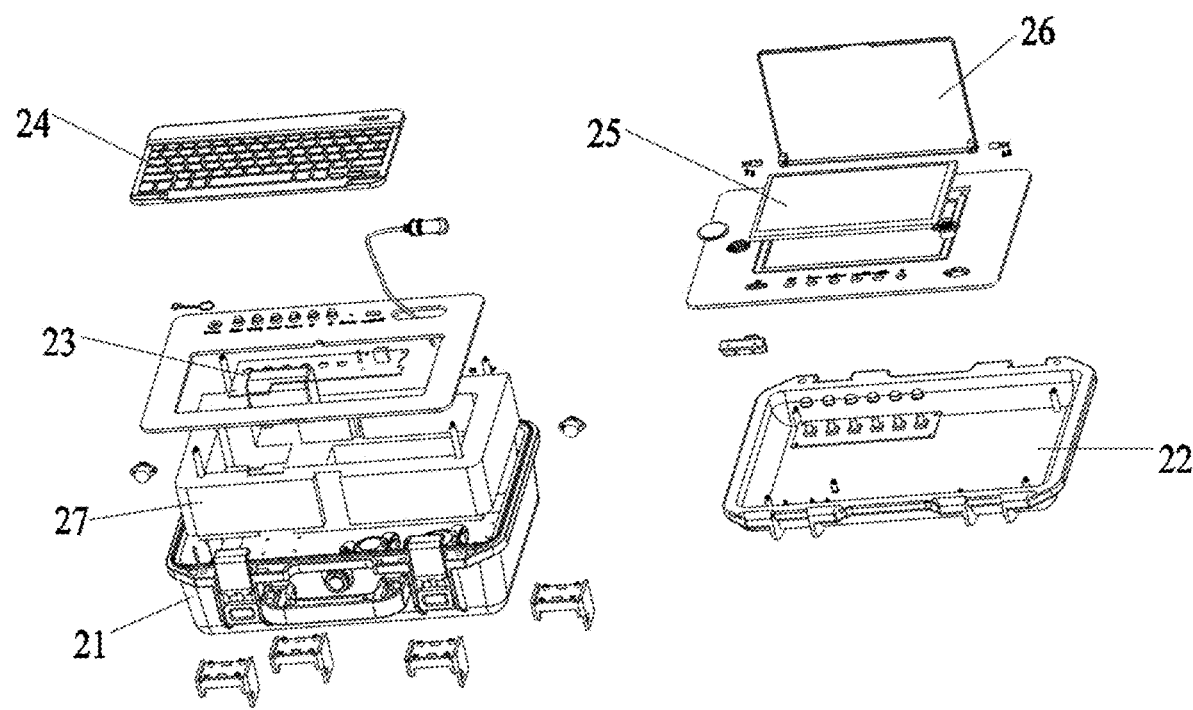
FIG. 3 is a schematic diagram of a structure of a main case according to the present invention.

Further, referring to FIG. 3, the main case 2 comprises a case body 21 and a case cover 22, a main control circuit board 23 and a control keyboard 24 are mounted in the case body 21, a display screen 25 is mounted at an inner side of the case cover 22, a protection plate 26 is further mounted at an outer side of the display screen 25, and the protection plate 26 is rotatably mounted on the case cover 22. In this embodiment, after the case cover 22 is closed, the protection plate 26 may cover a surface of the display screen 25 to effectively protect the display screen 25 and prevent the components inside the case body 21 from scratching the screen. Meanwhile, in the process of opening the case cover 22 for pipeline detection and analysis, the protection plate 26 may be opened to prevent light reflection on the screen caused by too bright external light, affecting the observation effect of the operating personnel on the display screen 25. Further, the control keyboard 24 is a detachable keyboard, and is wirelessly connected to the main case 2. Specifically, the connection may be a Bluetooth connection, a WiFi connection, or other connection manners. The operating personnel performs the operation of the related control instruction by controlling the control keyboard 24, controls the detection camera at a front end of the climbing wire to move and photograph videos through the main control circuit board 23, and analyzes the photographing result through a program arranged in the main case 2; and the relevant video in the detection process of the detection camera can be transmitted to the display screen 25 for the operating personnel to view, which assists the operating personnel in performing efficient and visual pipeline detection.

Further, the case body 21 is further filled with EVA foam 27. By filling the EVA foam 27, the electronic components in the case body 21 can be cushioned and protected to a certain extent. Meanwhile, in this embodiment, the EVA foam 27 is also provided with several storage cavities that may be configured to place related spare parts and detection tools.

Figure 4:
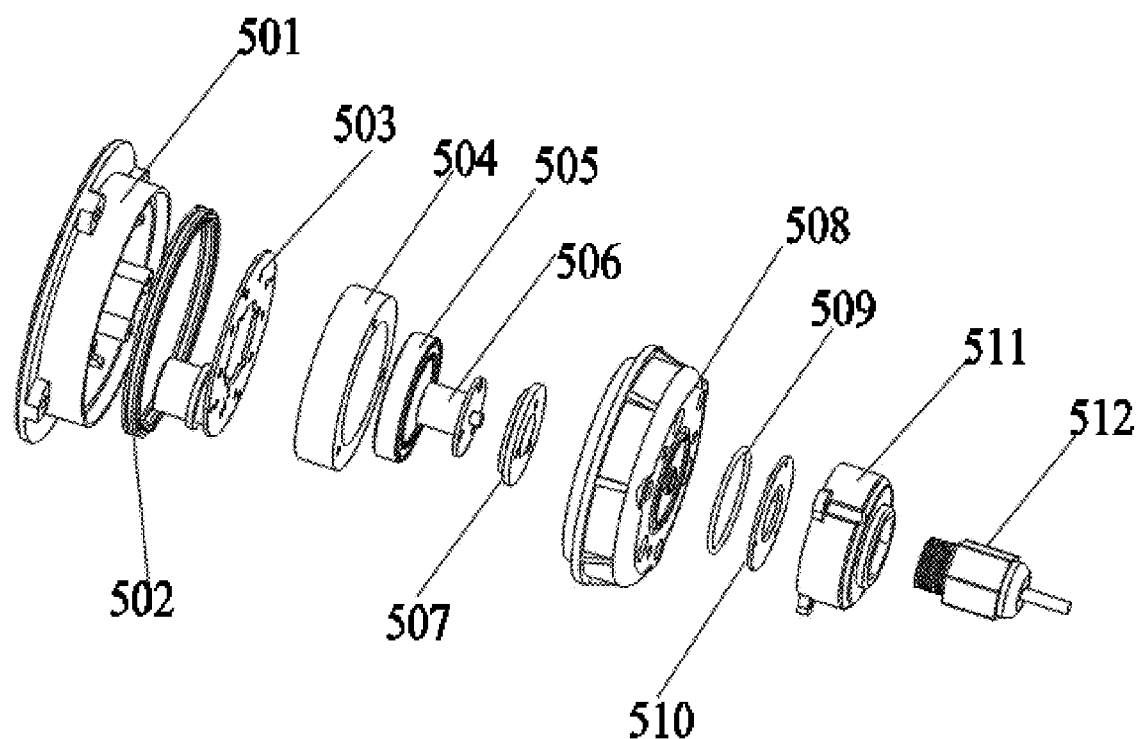
FIG. 4 is a schematic diagram of a structure of a rotating mechanism according to the present invention.
Figure 5:
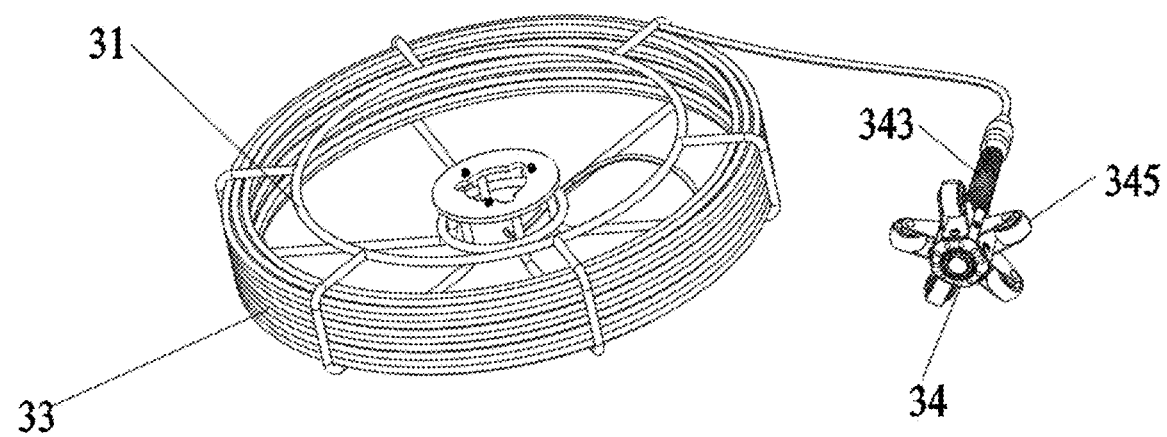
FIG. 5 is a schematic diagram of a structure of a wire spool according to the present invention.

Further, the first rotating mechanism 32 and the second rotating mechanism 42 have the same structure. Referring to FIG. 4, taking the first rotating mechanism 32 as an example, the first rotating mechanism comprises a fixed front cover 501, an anti-abrasion rotating sleeve 502 is clamped inside the fixed front cover 501, a first PCB 503 is clamped inside the fixed front cover 501, the first PCB 503 is located inside the anti-abrasion rotating sleeve 502, a bearing seat 504 is clamped at one side of the first PCB 503, a bearing 505 is clamped inside the bearing seat 504, a first slip ring 506 and a second slip ring 507 are clamped inside the bearing 505, a bottom cover 508 is clamped at one end that is of the fixed front cover 501 and that is located at an outer side of the second slip ring 507, a first tailstock 511 is arranged at one end of the bottom cover 508, a first waterproof ring 509 is arranged at a joint of the bottom cover 508 and the first tailstock 511, a second PCB 510 is clamped inside the first tailstock 511, and a waterproof rubber plug 512 is arranged at one end of the first tailstock 511. It should be noted that, the wire spool is provided with a mounting hole position for mounting the rotating mechanism, and the mounting frame 1 is provided with a driver, such as a driving motor, for controlling the rotation of the rotating mechanism. When the wire is required to be taken up and paid off, the rotating mechanism is driven by the driving motor to rotate forward or reverse so as to drive the wire spool to rotate forward or reverse. The climbing wire has a certain degree of rigidity, and during the rotation of the wire spool, the climbing wire wrapped around the wire spool can be extended out or taken up.

Figure 6:
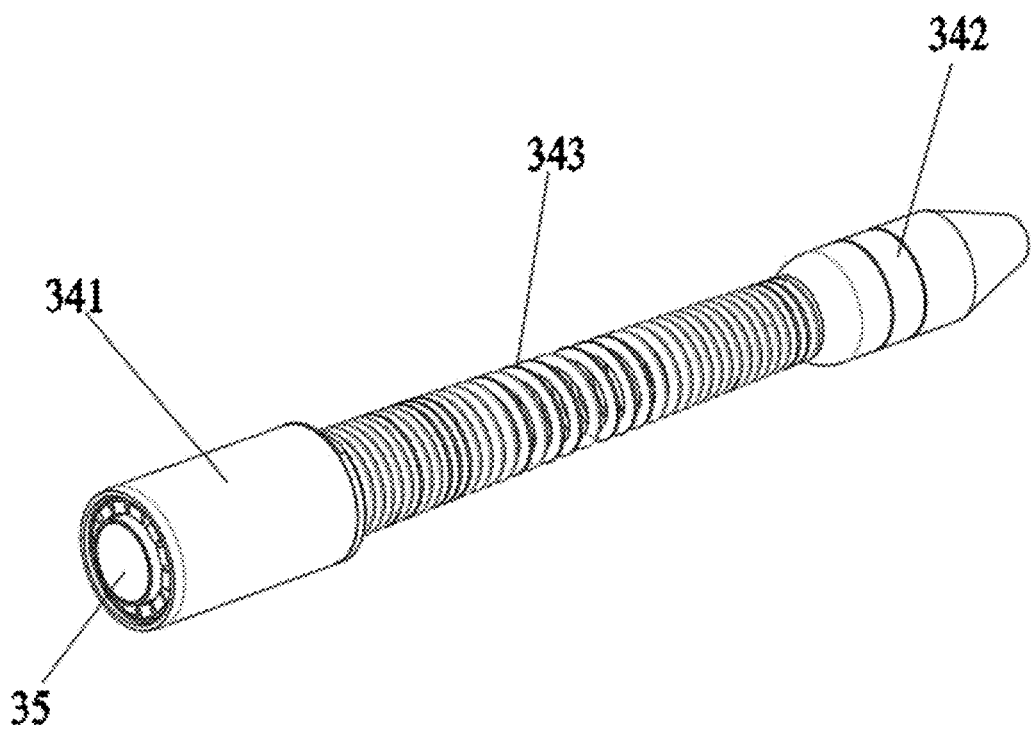
FIG. 6 is a schematic diagram of a structure of a first detection camera according to the present invention.

Further, referring to FIG. 6, the first detection camera 34 comprises a first front housing 341 and a first tail housing 342, the first front housing 341 and the first tail housing 342 are connected through a flexible spring 343, and the first lens 35 is mounted at an end of the first front housing 341. The first front housing 341 and the first tail housing 342 are connected through a flexible spring 343. When an obstacle is encountered, a moving direction of the first front housing 341 may be changed by the deformation of the flexible spring, thereby bypassing the obstacle. In this embodiment, the first lens 35 is mounted at a front end of the first front housing 341, and the photographing direction of the first lens extends along the axial direction of the first climbing wire 33, so that the first lens can take videos and images along the axial direction of the first climbing wire 33 for the detection and reference of the operating personnel.

Figure 7:
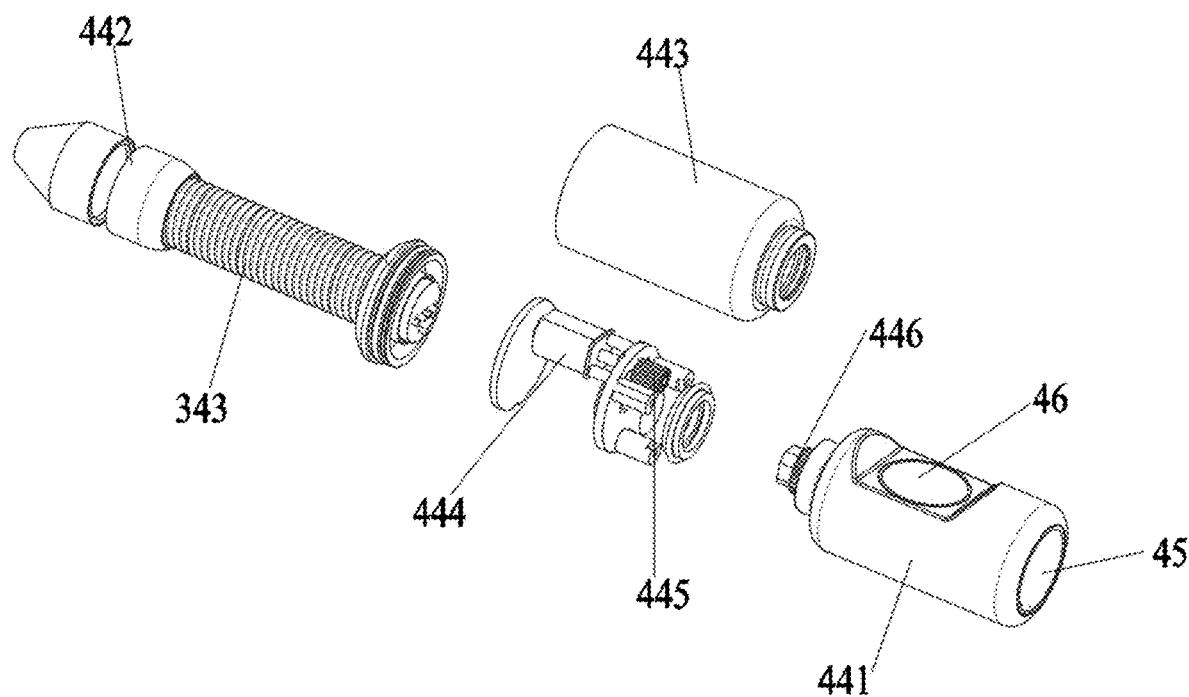
FIG. 7 is a schematic diagram of a structure of a second detection camera according to the present invention.

Further, referring to FIG. 7, the second detection camera 44 comprises a second front housing 441 and a second tail housing 442, and further comprises a rotary driving member configured to drive the second front housing 441 to rotate, the rotary driving member is connected to the second tail housing 442 through a flexible spring 343, the second lens 45 is mounted at an end of the second front housing 441, and the third lens 46 is mounted at a side surface of the second front housing 441. The second front housing 441 and the second tail housing 442 are connected through a flexible spring 343, when an obstacle is encountered, a moving direction of the second front housing 441 may be changed by the deformation of the flexible spring, thereby bypassing the obstacle. In this embodiment, the second lens 45 is mounted at a front end of the second front housing 441, and the photographing direction of the second lens extends along the axial direction of the second climbing wire 43, so that the second lens can take videos and images along the axial direction of the second climbing wire 43. The third lens 46 is mounted at a side surface of the second front housing 441, and the photographing direction of the third lens extends along the radial direction of the second front housing 441, so that the third lens can take videos and images along the radial direction of the second climbing wire 43. Meanwhile, the rotary driving member can drive the second front housing 441 to rotate, so that the third lens 46 can photograph in a rotary manner, which increases the photographing angle and range to meet the detection requirements of different pipeline environments.

In this embodiment, the rotary driving member comprises a middle housing 443, a rotary motor 444 is mounted in the middle housing 443, a driving end of the rotary motor 444 is connected to a driving gear 445, the driving gear 445 is engaged with a driven gear 446, and the second front housing 441 is in transmission connection with the driven gear 446. Specifically, when the rotary driving member is operated, the rotary motor 444 starts to rotate to drive the driving gear 445 to rotate, the driven gear 446 engaged with the driving gear 445 is driven to rotate, and the second front housing 441 is in transmission connection with the driven gear 446, so that the second front housing 441 can rotate along with the driven gear 446, thereby achieving the rotation of the second front housing 441 and performing multi-angle and large-range photographing and detection.

Further, a plurality of guide pulleys 345 are uniformly mounted at outer sides of the first detection camera 34 and the second detection camera 44. In the specific detection process, after the monitoring device is started, the rotary driving mechanism rotates to drive the wire spool to rotate, so that the climbing wire wrapped on the wire spool extends into the pipeline, and the addition of the guide pulley 345 may facilitate guiding the first detection camera 34 and the second detection camera 44 to climb and move to enable photographing and detection at different locations within the pipeline.

Figure 2:
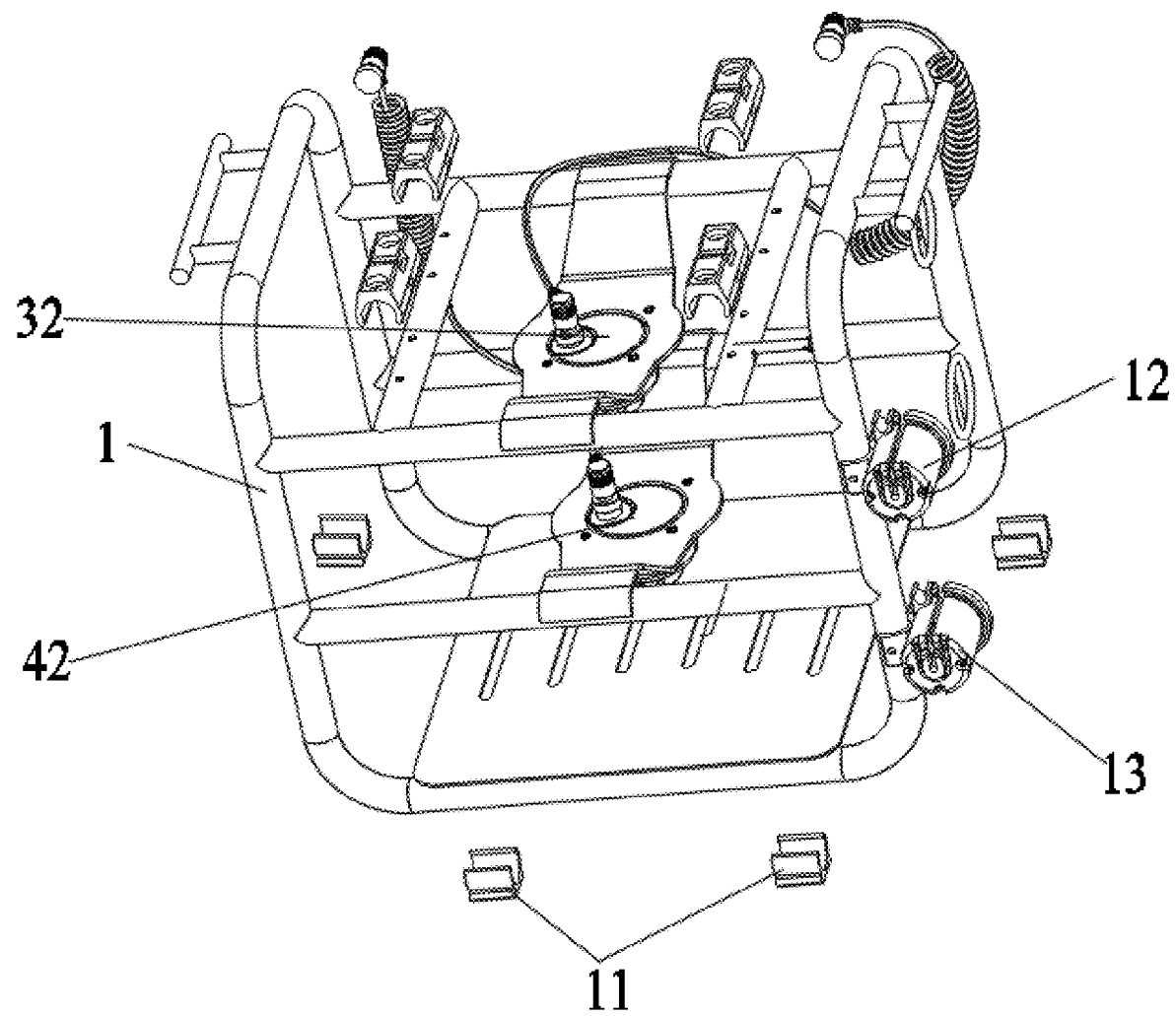
FIG. 2 is a schematic diagram of a structure of a mounting frame according to the present invention.

Further, referring to FIG. 2, the mounting frame 1 is provided in an iron frame structure to ensure the rigidity and stability of the overall structure. An anti-skidding clamping block 11 is detachably mounted at a bottom of the mounting frame 1. During detection, the anti-skidding clamping block can increase the friction between the mounting frame 1 and the ground, ensure the stability of the mounting frame, and prevent the mounting frame from shaking or even falling over, causing damage to the detection device.

Further, a first camera mounting seat 12 configured to mount the first detection camera 34 and a second camera mounting seat 13 configured to mount the second detection camera 44 are further provided on the mounting frame 1. When the detection operation is not needed, the first climbing wire 33 and the second climbing wire 43 are taken up to the first wire spool 31 and the second wire spool 41, respectively. The first detection camera 34 and the second detection camera 44 are respectively mounted in the first camera mounting seat 12 and the second camera mounting seat 13 to effectively protect the detection cameras and ensure the service life of the detection cameras.

The above mentioned contents are only optional embodiments of the present invention and are not intended to limit the patent scope of the present invention, and under the inventive concept of the present invention, the equivalent structural transformations made by using the contents of the specification and the drawings of the present invention, or direct/indirect applications to other related technical fields, are all included in the patent protection scope of the present invention.

The invention claimed is:

1. A pipeline detection device, comprising:
a mounting frame provided in a three-layer structure;
a main case configured to control the pipeline detection device to detect and analyze a pipeline and mounted at a top layer of the mounting frame;
a first wire spool mounted at a middle layer of the mounting frame, wherein a first rotating mechanism configured to drive the first wire spool to rotate is mounted at the middle layer of the mounting frame, a first climbing wire is wound on the first wire spool, one end of the first climbing wire is connected to the main case, the other end of the first climbing wire is connected to a first detection camera, the first detection camera is provided with a first lens, and a photographing direction of the first lens extends along an axial direction of the first climbing wire; and
a second wire spool mounted at a bottom layer of the mounting frame, wherein a second rotating mechanism configured to drive the second wire spool to rotate is mounted at the bottom layer of the mounting frame, a second climbing wire is wound on the second wire spool, one end of the second climbing wire is connected to the main case, the other end of the second climbing wire is connected to a second detection camera, the second detection camera is provided with a second lens and a third lens, a photographing direction of the second lens extends along an axial direction of the second climbing wire, and a photographing direction of the third lens extends along a radial direction of the second climbing wire.

2. The pipeline detection device according to claim 1, wherein the second detection camera comprises a second front housing and a second tail housing, and further comprises a rotary driving member configured to drive the second front housing to rotate, the rotary driving member is connected to the second tail housing through a flexible spring, the second lens is mounted at an end of the second front housing, and the third lens is mounted at a side surface of the second front housing.

3. The pipeline detection device according to claim 2, wherein the rotary driving member comprises a middle housing, a rotary motor is mounted in the middle housing, a driving end of the rotary motor is connected to a driving gear, the driving gear is engaged with a driven gear, and the second front housing is in transmission connection with the driven gear.

4. The pipeline detection device according to claim 3, wherein the main case comprises a case body and a case cover, a main control circuit board and a control keyboard are mounted in the case body, a display screen is mounted at an inner side of the case cover, a protection plate is further mounted at an outer side of the display screen, and the protection plate is rotatably mounted on the case cover.

5. The pipeline detection device according to claim 4, wherein the case body is further filled with EVA foam.

6. The pipeline detection device according to claim 3, wherein the first rotating mechanism and the second rotating mechanism each comprise a fixed front cover, an anti-abrasion rotating sleeve is arranged inside the fixed front cover, a first PCB is arranged inside the fixed front cover, the first PCB is located inside the anti-abrasion rotating sleeve, a bearing seat is arranged at one side of the first PCB, a bearing is arranged inside the bearing seat, a first slip ring and a second slip ring are arranged inside the bearing, a bottom cover is clamped at one end that is of the fixed front cover and that is located at an outer side of the second slip ring, a first tailstock is arranged at one end of the bottom cover, a first waterproof ring is arranged at a joint of the bottom cover and the first tailstock, a second PCB is arranged inside the first tailstock, and a waterproof rubber plug is arranged at one end of the first tailstock.

7. The pipeline detection device according to claim 3, wherein the first detection camera comprises a first front housing and a first tail housing, the first front housing and the first tail housing are connected through a flexible spring, and the first lens is mounted at an end of the first front housing.

8. The pipeline detection device according to claim 3, wherein a plurality of guide pulleys are uniformly mounted at outer sides of the first detection camera and the second detection camera.

9. The pipeline detection device according to claim 3, wherein the mounting frame is provided in an iron frame structure, and an anti-skidding clamping block is detachably mounted at a bottom of the mounting frame.

10. The pipeline detection device according to claim 9, wherein a first camera mounting seat configured to mount the first detection camera and a second camera mounting seat configured to mount the second detection camera are further provided on the mounting frame.

* * * * *